United States Patent
Galime et al.

(10) Patent No.: US 12,231,410 B2
(45) Date of Patent: Feb. 18, 2025

(54) METHODS, SYSTEMS, AND COMPUTER READABLE MEDIA FOR PROCESSING QUIC COMMUNICATIONS IN A NETWORK

(71) Applicant: Keysight Technologies, Inc., Santa Rosa, CA (US)

(72) Inventors: Michael Paul Galime, Utica, NY (US); Gabriel Oprisan, Bucharest (RO); Lucian Stoian, Bucharest (RO); Cosmin Banu, Bucharest (RO); Stefan Constantin Puiu, Bucharest (RO)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 289 days.

(21) Appl. No.: 17/742,359

(22) Filed: May 11, 2022

(65) Prior Publication Data

US 2023/0370435 A1     Nov. 16, 2023

(30) Foreign Application Priority Data

May 10, 2022   (RO) .............................. a 2022 00251

(51) Int. Cl.
*H04L 9/40* (2022.01)
*H04L 67/141* (2022.01)
*H04L 69/18* (2022.01)

(52) U.S. Cl.
CPC ........ *H04L 63/0428* (2013.01); *H04L 63/166* (2013.01); *H04L 67/141* (2013.01); *H04L 69/18* (2013.01)

(58) Field of Classification Search
CPC . H04L 63/0428; H04L 63/166; H04L 67/141; H04L 69/18; H04L 63/168; H04L 67/02
See application file for complete search history.

(56) References Cited

U.S. PATENT DOCUMENTS

| 7,076,650 B1 * | 7/2006 | Sonnenberg ........ H04L 63/0227 713/153 |
| 10,015,208 B2 | 7/2018 | Patil et al. |

(Continued)

OTHER PUBLICATIONS

"Usage statistics of QUIC for websites," W3Techs, Web Technology Surveys, https://w3techs.com/technologies/details/ce-quic, pp. 1-2 (Nov. 2021).

(Continued)

*Primary Examiner* — Ali S Abyaneh (57) ABSTRACT

Methods, systems, and computer readable media for processing QUIC communications in a network. An example system includes a first network interface for receiving a QUIC connection request from a first node in the network and, in response, establishing a first QUIC connection between the first node and the system. The system includes a QUIC processing module configured for receiving, via the first QUIC connection, encrypted QUIC data including a number of streams and decrypting the encrypted QUIC data, resulting in decrypted QUIC data. The QUIC processing module is configured for extracting each of the streams from the decrypted QUIC data, resulting in a plurality of extracted streams, and packaging at least one of the extracted streams into a non-QUIC protocol format, resulting in at least one packaged stream. The system includes a second network interface for transmitting the packaged stream to a second node in the network.

13 Claims, 9 Drawing Sheets

(56) References Cited

U.S. PATENT DOCUMENTS

| | | | |
|---|---|---|---|
| 10,778,812 B1* | 9/2020 | Kou | H04L 69/08 |
| 10,904,219 B2 | 1/2021 | Eriksson et al. | |
| 2014/0298041 A1* | 10/2014 | Consalus | G06F 21/602 |
| | | | 713/193 |
| 2017/0070531 A1* | 3/2017 | Huston, III | H04L 63/0428 |
| 2018/0041613 A1* | 2/2018 | Lapidous | H04L 25/14 |
| 2019/0116123 A1* | 4/2019 | Shiell | H04L 69/161 |
| 2023/0074838 A1* | 3/2023 | De Foy | H04L 69/164 |
| 2023/0085513 A1* | 3/2023 | Mestery | H04L 67/1012 |
| | | | 709/219 |

OTHER PUBLICATIONS

Duke, "QUIC Will Eat the Internet," Blog, Office of the CTO, https://www.f5.com/company/blog/quic-will-eat-the-Internet, pp. 1-4 (Feb. 22, 2021).

"Savoury implementation of the QUIC transport protocol and HTTP/3," cloudflare/quiche, https://github.com/cloudflare/quiche/releases, pp. 1-18 (Feb. 4, 2022).

Reen et al., "DPIFuzz: A Differential Fuzzing Framework to Detect DPI Elusion Strategies for QUIC," ACSAC 2020, pp. 1-13 (Dec. 7-11, 2020).

Grigorik et al., "Introduction to HTTP/2," web.dev, pp. 1-21 (Sep. 1, 2019).

Parikh, "Designing a Network Validation Pipeline," NET, https://www.intentionet.com/blog/designing-a-network-validation-pipeline/, pp. 1-8 (Mar. 15, 2019).

* cited by examiner

Connection Definition Table

| Session ID | Client-Side Connection ID | Client-Side Connection Protocol | Server-Side Connection ID | Server_Side Connnection Protocol |
|---|---|---|---|---|
| session_1 | conn_A | QUIC | conn_B | QUIC |

Stream Mapping Table

| Client-Side Connection ID | Client-Side Stream ID | Server-Side Connection ID | Server-Side Stream ID | Tool Stream ID |
|---|---|---|---|---|
| conn_A | Stream 406 | conn_B | Stream 410 | stream_5 |
| conn_A | Stream 408 | conn_B | Stream 412 | stream_6 |

Tool Definition & Mapping Table

| Monitored Session ID | Tool Connection ID | Tool Protocol | Tool Stream ID |
|---|---|---|---|
| session_1 | conn_x | HTTP/2 tcp | Stream 414 |
| session_1 | conn_x | HTTP/2 tcp | Stream 416 |

Connection Definition Table

| Session ID | Client-Side Connection ID | Client-Side Connection Protocol | Server-Side Connection ID | Server_Side Connnection Protocol |
|---|---|---|---|---|
| session_1 | conn_A | QUIC | conn_B | QUIC |

Stream Mapping Table

| Client-Side Connection ID | Client-Side Stream ID | Server-Side Connection ID | Server-Side Stream ID | Tool Stream ID |
|---|---|---|---|---|
| conn_A | Stream 406 | conn_B | Stream 410 | stream_5 |
| conn_A | Stream 408 | conn_B | Stream 412 | stream_6 |

Tool Definition & Mapping Table

| Monitored Session ID | Tool Connection ID | Tool Protocol | Tool Stream ID |
|---|---|---|---|
| session_1 | conn_x | HTTP/1.x tcp | Stream 604 |
| session_1 | conn_y | HTTP/1.x tcp | Stream 606 |

Connection Definition Table

| Session ID | Client-Side Connection ID | Client-Side Connection Protocol | Server-Side Connection ID | Server_Side Connnection Protocol |
|---|---|---|---|---|
| session_1 | conn_A | QUIC | conn_B | HTTP/1.x TCP |
| session_1 | conn_A | QUIC | conn_C | HTTP/1.x TCP |

Stream Mapping Table

| Client-Side Connection ID | Client-Side Stream ID | Server-Side Connection ID | Server-Side Stream ID |
|---|---|---|---|
| conn_A | Stream 406 | conn_B | Stream 410 |
| conn_A | Stream 408 | conn_C | Stream 412 |

FIG. 9

METHODS, SYSTEMS, AND COMPUTER READABLE MEDIA FOR PROCESSING QUIC COMMUNICATIONS IN A NETWORK

PRIORITY CLAIM

This application claims the priority benefit of Romanian Patent Application Serial Number a 2022 10024, filed May 10, 2022, the disclosure of which is incorporated herein by reference in its entirety.

TECHNICAL FIELD

The subject matter described herein relates to networking devices and methods, systems, and computer readable media for processing QUIC communications in a network.

BACKGROUND

QUIC (pronounced "quick") is a general-purpose transport layer network protocol. QUIC is used, for example, for connections from the Chrome web browser to Google's servers, and various other web browsers support QUIC. Although the name "QUIC" was initially proposed as the acronym for "Quick UDP Internet Connections", it is no longer used as an acronym; it is simply the name of the protocol.

QUIC can improve performance of connection-oriented web applications that are currently using TCP. QUIC establishes a number of multiplexed connections between two endpoints using User Datagram Protocol (UDP), and could potentially be used to obsolete TCP at the transport layer for many applications.

While it is possible to decrypt QUIC traffic, once decrypted, the information is not interpretable and readily understandable by some systems. For example, the decrypted QUIC traffic may not be interpretable by threat detection, inspection, and protection tools.

Accordingly, a need exists for methods, systems, and computer readable media processing QUIC communications in a network.

SUMMARY

Methods, systems, and computer readable media for processing QUIC communications in a network. An example system includes a first network interface for receiving a QUIC connection request from a first node in the network and, in response, establishing a first QUIC connection between the first node and the system. The system includes a QUIC processing module configured for receiving, via the first QUIC connection, encrypted QUIC data including a number of streams and decrypting the encrypted QUIC data, resulting in decrypted QUIC data. The QUIC processing module is configured for extracting each of the streams from the decrypted QUIC data, resulting in a plurality of extracted streams, and packaging at least one of the extracted streams into a non-QUIC protocol format, resulting in at least one packaged stream. The system includes a second network interface for transmitting the packaged stream to a second node in the network.

In some examples, packaging at least one of the extracted streams into a non-QUIC protocol format comprises encapsulating the at least one of the extracted streams for transport by hypertext transfer protocol (HTTP) or hypertext transfer protocol secure (HTTPS).

In some examples, the QUIC processing module is configured for packaging each of the extracted streams into a respective transport control protocol (TCP) connection. In some examples, the QUIC processing module is configured for collectively packaging the extracted streams into a same TCP connection.

In some examples, the second node comprises a server endpoint. In some examples, the second node comprises a network security tool. The network security tool can be configured for processing messages in the non-QUIC protocol format. The network security tool can be, for example, a firewall, a deep packet inspection tool, an intrusion detection system (IDS), an intrusion prevention system (IPS), and a data leakage protection tool.

In some examples, the system includes a third network interface for establishing a second QUIC connection with a third node in the network and transmitting the encrypted QUIC data to the third node via the second QUIC connection.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

This document describes methods, systems, and computer readable media for processing QUIC communications in a network. In some examples, a system uses a man-in-the-middle (MITM) QUIC decrypt module, which will allow network security tools to receive, monitor, and become a bump in the wire of decrypted QUIC which has been encapsulated in any standards-based transport and communications protocol, and optionally allow the QUIC decrypted payload data to be encapsulated in block format for transport over non-standard proprietary protocols.

Figure 1:
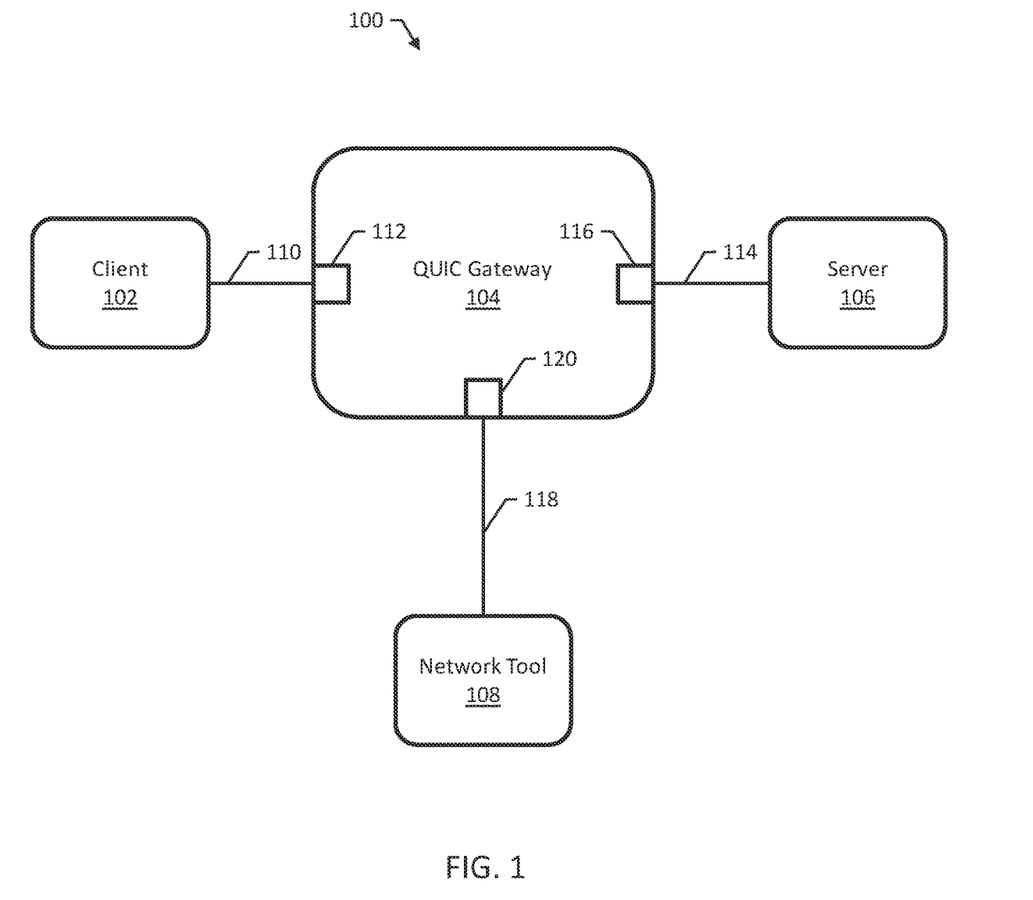
FIG. 1 is a block diagram illustrating an example network.

FIG. 1 is a block diagram illustrating an example network 100. The network 100 can be, e.g., a telecommunications network, a local area network (LAN), or a wide area network (WAN).

The network 100 includes a client 102 communicating via a QUIC gateway 104 with a server 106. The client 102 can be any appropriate type of computing device or system for communicating on the network 100. For example, the client 102 can be a network endpoint such as a user device. The server 106 is also a computing device or system for communicating on the network 100. The client 102 and the server 106 communicate using the QUIC protocol.

The QUIC gateway 104 performs QUIC processing on the network 100 to facilitate interworking with devices and systems that are not configured for processing messages in the QUIC protocol. For example, the QUIC gateway 104 can perform QUIC processing for interworking with a network tool 108 that is configured for processing messages in a non-QUIC protocol format. The network tool 108 can be configured, for example, for using transmission control protocol (TCP) and hypertext transfer protocol (HTTP). The network tool 108 can be a network security tool, e.g., a firewall, a deep packet inspection tool, an intrusion detection system (IDS), an intrusion prevention system (IPS), and a data leakage protection tool.

In some examples, the network tool 108 provides network services for various devices using TCP and HTTP in the network 100, and the network tool 108 may be unable to provide those services for the client 102 and the server 106 that are using QUIC. The QUIC gateway 104 facilitates interworking with the network tool 108, which can ultimately improve the performance or security or both of the network 100.

The QUIC gateway 104 includes a first network interface 112 for receiving a QUIC connection request from the client 102 and, in response, establishing a first QUIC connection 110 between the client 102 and the QUIC gateway 104. The QUIC gateway 104 includes a second network interface 116 for establishing a second QUIC connection 114 with the server 106. The QUIC gateway 104 receives encrypted QUIC data from the client 102 on the first QUIC connection 110 and transmits the encrypted QUIC data to the server 106 on the second QUIC connection 114.

The QUIC gateway 104 includes a third network interface 120 for establishing a non-QUIC connection 118 with the network tool 108. In operation, the QUIC gateway 104 facilitates interworking with the network tool 108 by decrypting the QUIC data communicated between the client 102 and the server 106, repackaging the decrypted data into a non-QUIC protocol format, and transmitting the repackaged data on the non-QUIC connection 118.

In some examples, the QUIC gateway 104 is configured for receiving, via the first QUIC connection 110, encrypted QUIC data that includes a number of streams. The QUIC gateway 104 is configured for decrypting the encrypted QUIC data, resulting in decrypted QUIC data, and extracting each of the streams from the decrypted QUIC data, resulting in a plurality of extracted streams. The QUIC gateway 104 is configured for packaging at least one of the extracted streams into a non-QUIC protocol format, resulting in at least one packaged stream. The QUIC gateway 104 transmits the packaged stream to the network tool 108 using the non-QUIC connection 118. The packaged stream can be sent in the clear or can be encrypted, as appropriate depending on whether the network tool 108 is configured for receiving encrypted or decrypted data.

Packaging the extracted streams can include encapsulating at least one of the extracted streams for transport by HTTP or HTTPS. Packaging the extracted streams into a non-QUIC protocol format can include re-encrypting the extracted streams, e.g., using secure sockets layer (SSL) or transport layer security (TLS), and packaging the resulting encrypted streams for transport by TCP and HTTP/HTTPS or another appropriate protocol. In some examples, the QUIC gateway 104 packages each of the extracted streams into a respective TCP connection. In some examples, the QUIC gateway packages all of the extracted streams into a same TCP connection.

In some examples, the QUIC gateway 104 includes a user interface to allow a user to select or configure the non-QUIC protocol format. For example, the QUIC gateway 104 can include a graphical user interface that can be presented to a network administrator to select between HTTP/1.x or HTTP/2.0. The network administrator can select an appropriate protocol based on the capabilities of the network tool 108. In other examples, the QUIC gateway 104 can query the network tool 108 and receive a response to determine the appropriate protocol.

In the example shown in FIG. 1, the QUIC gateway 104 sends decrypted and repackaged streams to the network tool 108. In general, however, the QUIC gateway 104 can send repackaged streams to any appropriate device to facilitate QUIC interworking. For example, the QUIC gateway 104 can be configured to send repackaged streams to a server that is not configured for receiving QUIC communications.

The QUIC connection between the client 102 and the server 106 is bi-directional. The client 102 can both send and receive data, and the server 106 can both send and receive data. The QUIC gateway 104 can extract data from the QUIC connection regardless of the direction of the flow of information, i.e., the QUIC gateway 104 can extract data flowing from the client 102 to the server 106 or the server 106 to the client 102 and package the extracted data for transport to the network tool 108.

The QUIC protocol specifies the use of ephemeral keys. In general, the QUIC gateway 104 can use any appropriate technology to perform QUIC decryption. The QUIC gateway 104 can perform in-band decryption or out-of-band decryption.

Figure 2:
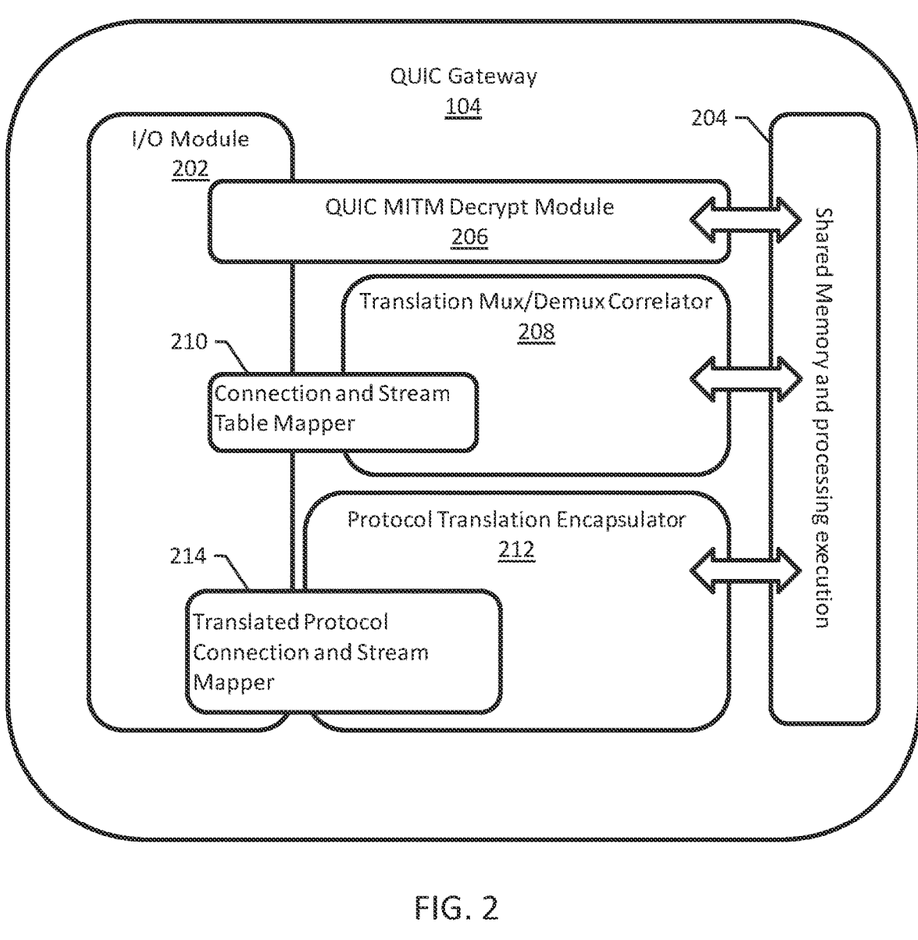
FIG. 2 is a block diagram illustrating an example computing architecture for the QUIC gateway.

FIG. 2 is a block diagram illustrating an example computing architecture for the QUIC gateway 104. The QUIC gateway 104 includes an input/output module 202 and shared memory and processing resources 204, e.g., one or more processors and memory storing executable instructions for the processors.

The QUIC gateway 104 includes a QUIC man-in-the-middle decrypt module 206 configured for decrypting encrypted QUIC data. The QUIC gateway 104 includes a translation mux/demux correlator 208 configured for multiplexing and demultiplexing streams of data. The QUIC gateway 104 includes a connection and stream table mapper 210 that is used by the translation mux/demux correlator 208 for mapping QUIC streams to streams in other protocols, e.g., TCP streams.

The QUIC gateway 104 includes a protocol translation encapsulator 212 configured for repackaging QUIC data into a non-QUIC protocol format. The QUIC gateway 104 includes a translated protocol connection and stream mapper 214 that is used by the protocol translation encapsulator 212 for mapping repacked streams to outgoing connections.

QUIC works over user datagram protocol (UDP), so the QUIC gateway is configured to parse UDP packets, keep a UDP connection table, and detect which connections are QUIC. In some examples, the first UDP packets in a new connection are parsed to decide if they are initial QUIC packets. An initial QUIC packet is at least 1200 bytes long. The QUIC gateway 104 can be configured to filter out UDP connections where the initial packet is less than 1200 bytes long, which can result in filtering out a lot of non-QUIC UDP traffic.

An initial QUIC packet contains an embedded Client Hello, encrypted with a known key. The QUIC gateway 104 can decrypt the initial packet and apply policy rules to the initial packets, e.g., using some or all of conventional policy rules for TLS connections.

Figure 3:
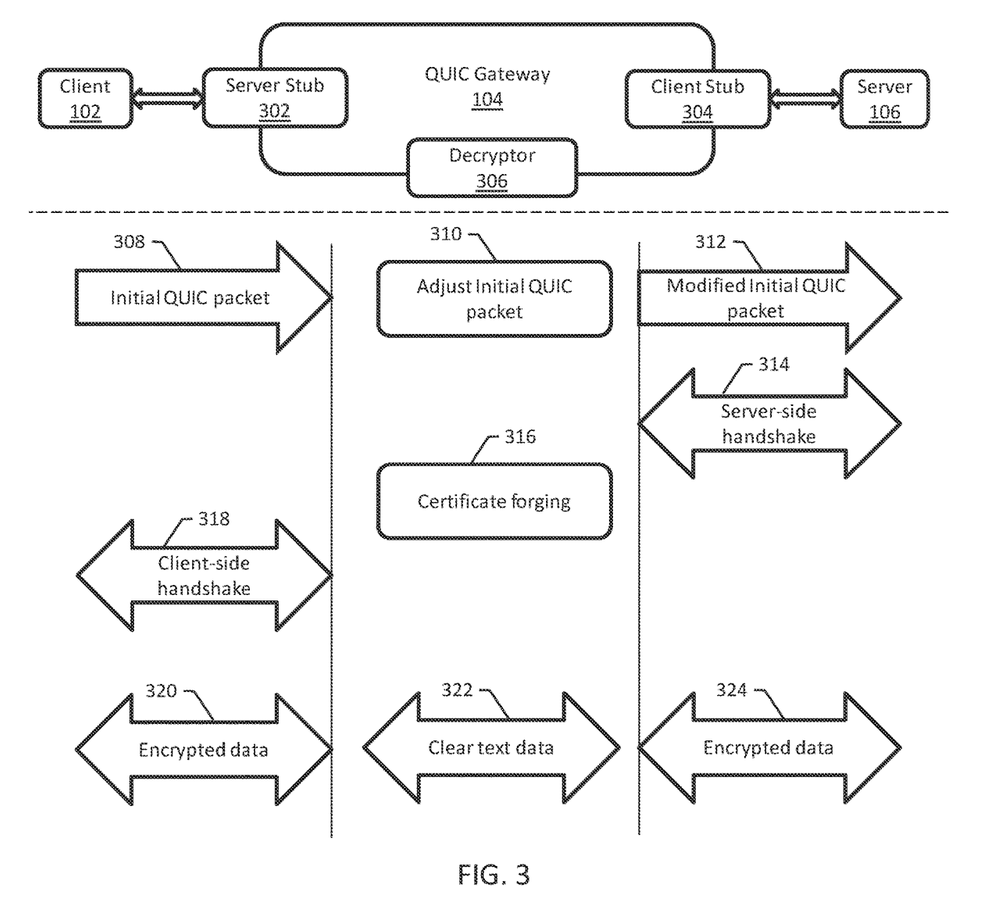
FIG. 3 is a diagram illustrating an example of QUIC connection splitting.

FIG. 3 is a diagram illustrating an example of QUIC connection splitting. The top portion of FIG. 3 is a block diagram showing the client 102, the QUIC gateway 104, and the server 106. The QUIC gateway 104 implements a server stub 302 for the QUIC connection with the client 102, a client stub 304 for the QUIC connection with the server 106, and a decryptor 306 for decrypting QUIC data exchanged between the client 102 and the server 106. The bottom portion of FIG. 3 is a ladder diagram illustrating an example exchange of messages between the client 102 and the server 106 to establish a connection via the QUIC gateway 104.

The client 102 sends an initial QUIC packet 308 to the server stub 302. The QUIC gateway adjusts 310 the initial QUIC packet and the server 106 receives the modified initial QUIC packet 312. The server 106 then performs a server-side handshake 314 with the client stub 304. The QUIC gateway 104 then performs certificate forging 316 to allow the QUIC gateway 104 to act as a min-in-the-middle proxy between the client 102 and the server 106. The client 102 then performs a client-side handshake 318 with the server stub 302 to complete the QUIC connections.

Certificate forging can include, based on the certificate received from the server and the re-sign CA certificate, constructing a new server certificate by copying appropriate information, in order to support the validation performed by various client applications. The generated certificate will be signed with the re-sign CA certificate key. The information copied from the server's certificate can include, for example, one or more of:

Subject
Expiration dates
Key type (RSA/ECC) and key size (new keys will be generated)
Subject alternative names
Key usage/extended key usage The information copied from the re-sign CA certificate can include, for example, one or more of:

Issuer (copied from the re-sign CA's subject)
Authority key ID (copied from the re-sign CA's subject key ID)

The same mechanism can be used for encrypted TCP connections as well (i.e., to match the certificates between TCP and QUIC) in order to avoid potential issues with various clients/servers.

The client 102 sends encrypted data 320 via the QUIC connection. The QUIC gateway 104 decrypts the encrypted data, resulting in clear text data 322. The clear text data can be repackaged into a non-QUIC format and transmitted, e.g., to a network security tool or a different server. The QUIC gateway 104 transmits the encrypted data 324 to the server 106.

The QUIC connection between the client 102 and the server 106 is bi-directional. The client 102 can both send and receive data, and the server 106 can both send and receive data. The QUIC gateway 104 can extract data from the QUIC connection regardless of the direction of the flow of information, i.e., the QUIC gateway 104 can extract data flowing from the client 102 to the server 106 or the server 106 to the client 102 and package the extracted data for transport to the network tool 108.

The QUIC gateway 104 can implement the server stub 302 and the client stub 304 using any appropriate QUIC technology. For example, the QUIC gateway 104 can use the Quiche library developed and used in production by Cloudfare, which implements the QUIC specification, including the encryption and the transport protocols and is input/output agnostic.

To illustrate QUIC mux/demux protocol translation, consider an example scenario where a network tool requires decrypted data on a TCP connection. The QUIC gateway 104 decrypts the data and repackages the decrypted QUIC data into one or more TCP connections, and then, in the case of in-band monitoring, back to QUIC to complete the QUIC connection.

A QUIC connection can have multiple data streams, but TCP has only one stream per connection
If the network tool supports HTTP/2.0, the QUIC gateway 104 can use TCP+HTTP/2.0 multiplexing
If HTTP/2.0 is not an option (e.g., either the network tool does not support or the original data is not HTTP) the QUIC gateway 104 can create multiple TCP connections for a single QUIC connection (by using careful TCP port monitoring, to not overlap the existing connections)
If future QUIC revisions support cleartext QUIC, then the translation module could select that as a tool enablement protocol.

Figure 4:
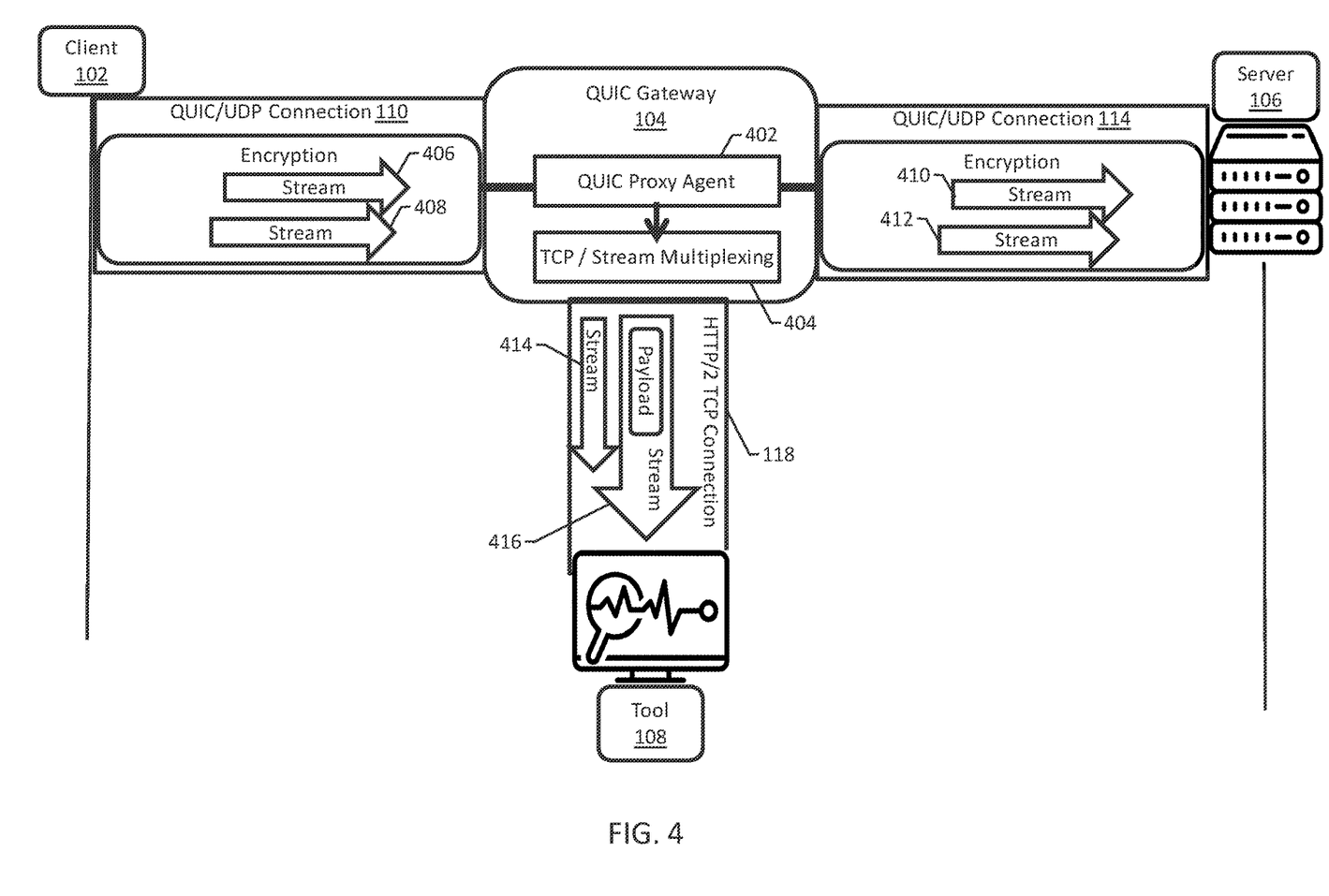
FIG. 4 is a block diagram illustrating an example scenario where the QUIC gateway is configured to establish a proxied QUIC connection between the client and the server.

FIG. 4 is a block diagram illustrating an example scenario where the QUIC gateway 104 is configured to establish a proxied QUIC connection between the client 102 and the server 106. A QUIC proxy agent 402 establishes the proxied QUIC connection by the first QUIC connection 110 and the second QUIC connection 114. The QUIC gateway 104 is configured to receive and decrypt (and subsequently re-encrypt) QUIC data and header frames travelling from the client to the QUIC gateway 104 as well as those travelling from the server 106 to the QUIC gateway 104.

A TCP/stream multiplexer 404 is configured for data replication by extracting at least a portion of the decrypted QUIC header/data frame information traversing the proxied connection and to package the extracted information for transmission to one or more monitoring tools, e.g., the network tool 108. In this example, the information is packaged and sent to a monitoring tool using an HTTP/2.0 connection that utilizes TCP/IP. As such, the data replication includes multiplexing multiple streams onto a single TCP connection 118. In particular, the first QUIC connection 110 includes two streams 406 and 408, the second QUIC connection 114 includes two streams 410 and 412, and the data replication includes multiplexing two streams 414 and 416 on the TCP connection 118.

In some examples, the data replication includes automatically detecting whether the network tool 108 is capable of supported HTTP/2.0-based communications (e.g., by sending a query message to the network tool 108 and receiving a response indicating the capability) and, if so, stream multiplexing is performed. If the network tool 108 cannot support HTTP/2.0-based communications, then a non-multiplexed communication can be used, e.g., as described further below with reference to FIGS. 6 and 7.

Figure 5:
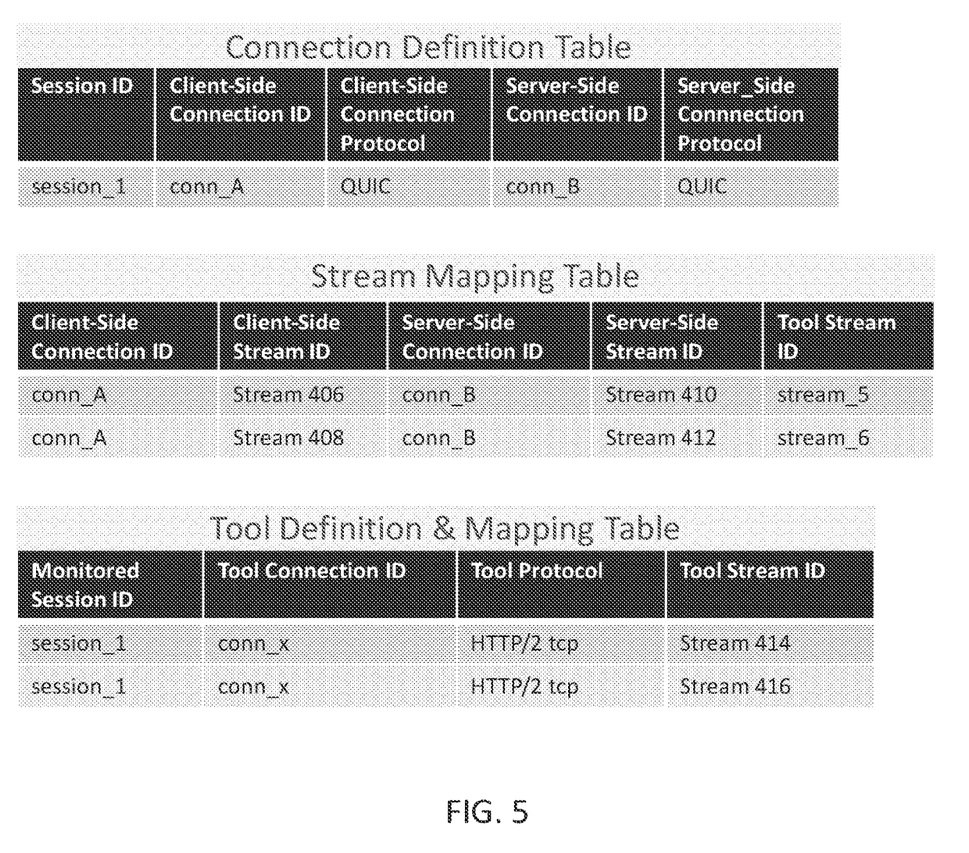
FIG. 5 shows an example connection definition table, stream mapping table, and tool definition and mapping table for the example scenario depicted in FIG. 4.

FIG. 5 shows an example connection definition table, stream mapping table, and tool definition and mapping table for the example scenario depicted in FIG. 4. In this example, the QUIC interworking inspection gateway generates and maintains client- and server-side connection definition and binding information, which is used to facilitate interworking and monitoring of QUIC communications. The mapping structure/data shown in FIG. 5 is simply one example of how connection/protocol interworking functionality could be implemented.

Figure 6:
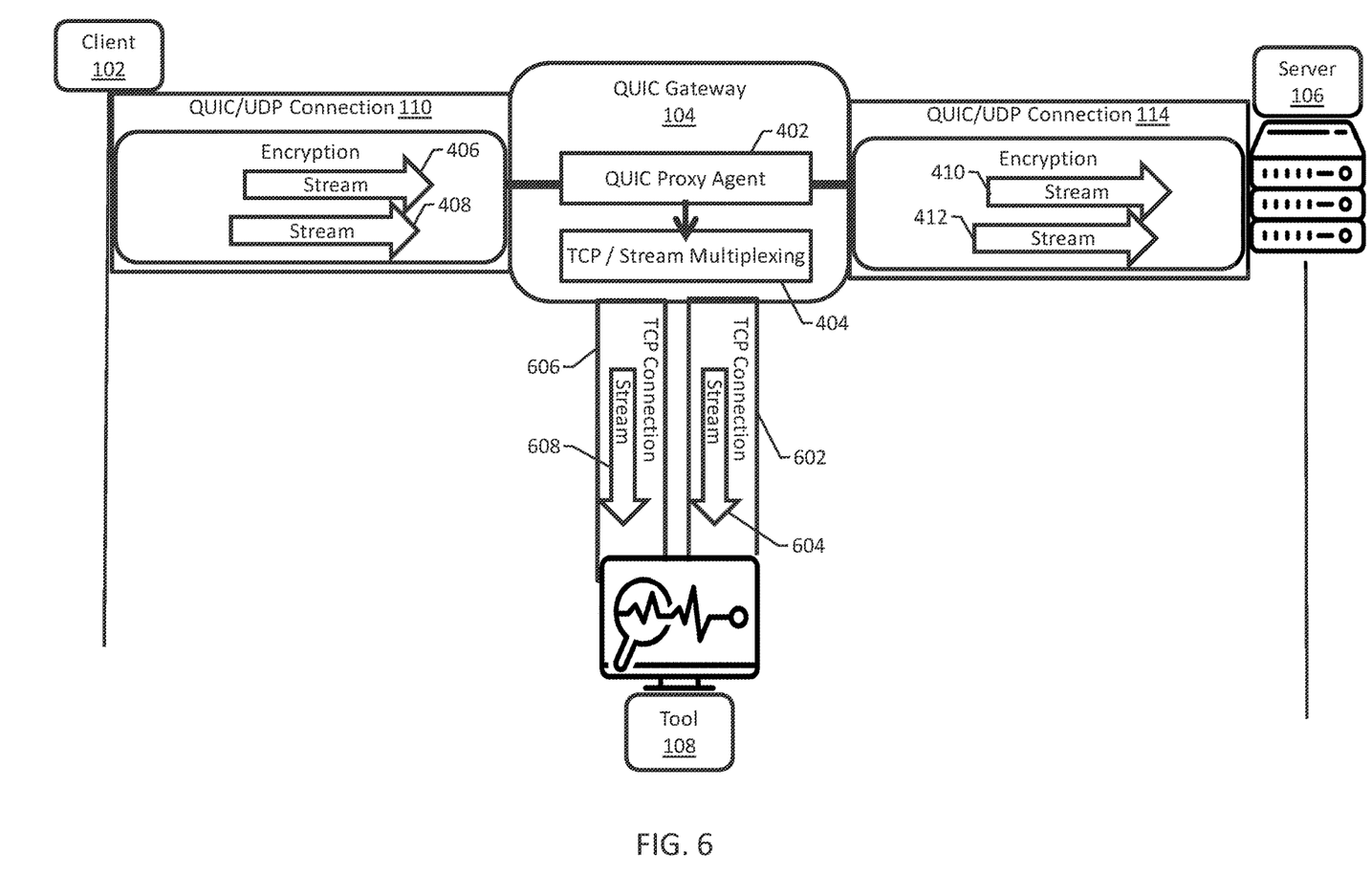
FIG. 6 is a block diagram illustrating an example scenario where the QUIC gateway is configured to establish a proxied QUIC connection between the client and the server.

FIG. 6 is a block diagram illustrating an example scenario where the QUIC gateway 104 is configured to establish a proxied QUIC connection between the client 102 and the server 106. A QUIC proxy agent 402 establishes the proxied QUIC connection by the first QUIC connection 110 and the second QUIC connection 114. The QUIC gateway 104 is configured to receive and decrypt (and subsequently re-encrypt) QUIC data and header frames travelling from the client to the QUIC gateway 104 as well as those travelling from the server 106 to the QUIC gateway 104.

A TCP/stream multiplexer 404 is configured for data replication by extracting at least a portion of the decrypted QUIC header/data frame information traversing the proxied connection and to package the extracted information for transmission to one or more monitoring tools, e.g., the network tool 108. In this example, the data replicated is packaged and sent to the network tool 108 using an HTTP/1.x connection that utilizes TCP/IP. As such, the data replication includes establishing multiple TCP connections 602 and 608 that each transport a single stream (streams 604 and 606).

Figure 7:
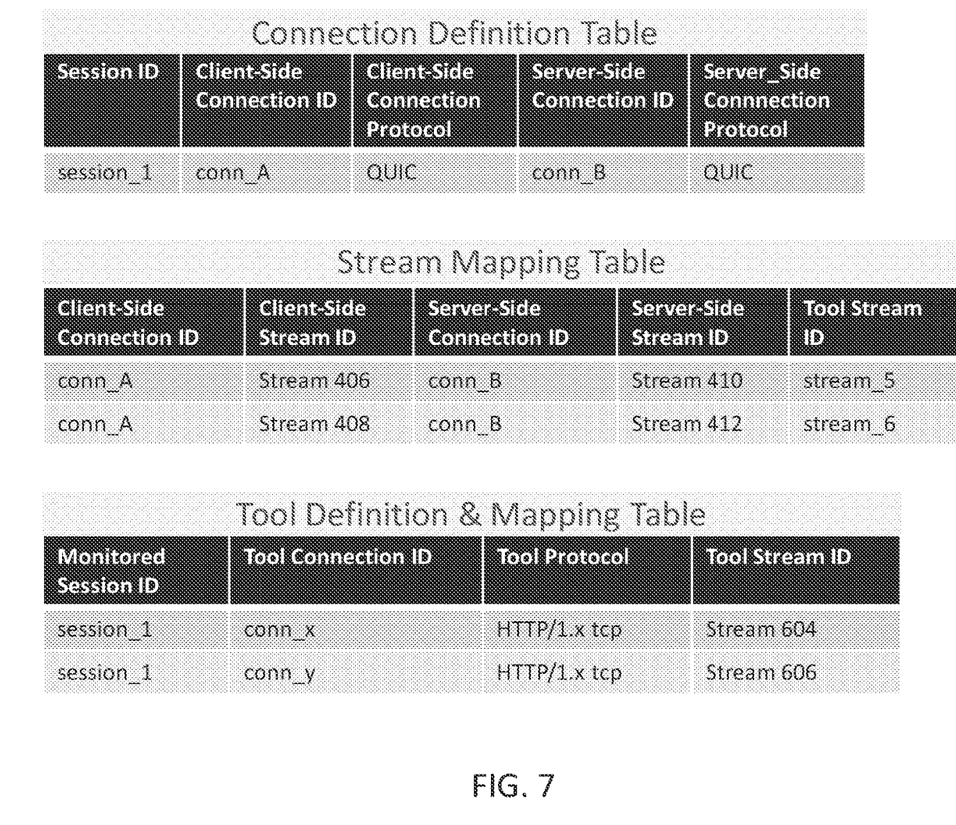
FIG. 7 shows an example connection definition table, stream mapping table, and tool definition and mapping table for the example scenario depicted in FIG. 6.

FIG. 7 shows an example connection definition table, stream mapping table, and tool definition and mapping table for the example scenario depicted in FIG. 6. In this example, the QUIC interworking inspection gateway generates and maintains client- and server-side connection definition and binding information, which is used to facilitate interworking and monitoring of QUIC communications. The mapping structure/data shown in FIG. 7 is simply one example of how connection/protocol interworking functionality could be implemented.

Figure 8:
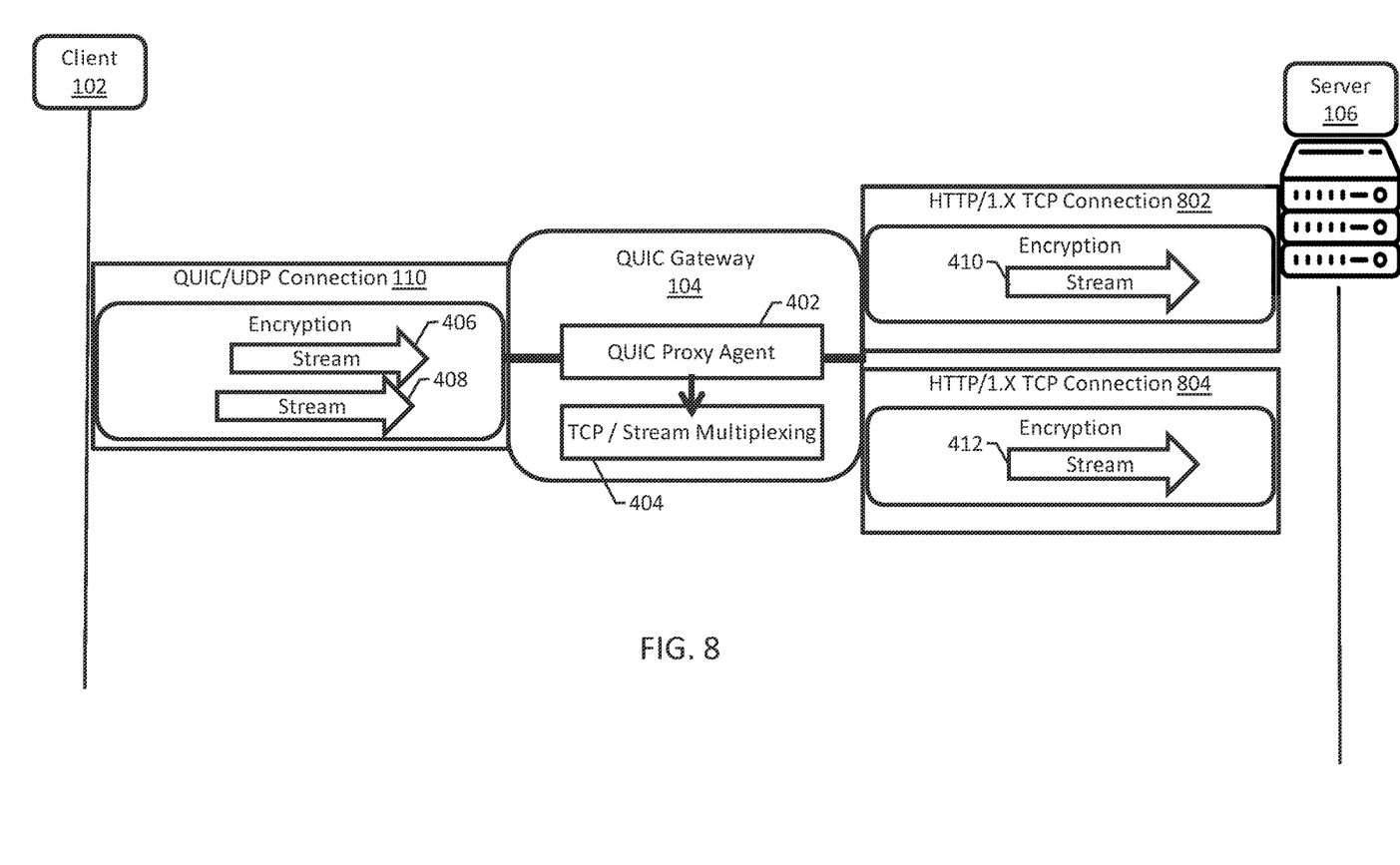
FIG. 8 is a block diagram illustrating an example scenario where the QUIC gateway is configured to establish a proxied QUIC connection between the client and the server.

FIG. 8 is a block diagram illustrating an example scenario where the QUIC gateway 104 is configured to establish a proxied QUIC connection between the client 102 and the server 106. In this example, the first connection 110 is a QUIC connection, but the server 106 is unwilling or unable to communicate using the QUIC protocol. As such, the server side of the QUIC gateway 103 is configured to negotiate a non-QUIC connection with the server 106.

In this case, the QUIC gateway 104 determines that the QUIC connection 110 includes two streams 406 and 408 and that the server 106 is only able or willing to connect using HTTP/1.X TCP. Accordingly, the QUIC gateway 104 proceeds to establish two TCP connections 802 and 804, each of which is used to transport one of the streams 410 and 412 to the server 106. The QUIC gateway 104 is configured to receive and decrypt (and subsequently re-encrypt) QUIC data and header frames associated with the two streams 406 and 408 travelling from the client to the QUIC gateway 104 and to multiplex at least a portion of the contents of the frames in those streams onto HTTP/1.x TCP connections 802 and 804. The inverse of the demultiplexing process is performed on messages traveling from the server 106 to the QUIC gateway 104 on the two HTTP/1.x TCP connections 802 and 804, such that messages received on those connections 802 and 804 are decrypted (e.g., using TLS decryption) and the decrypted data is multiplexed back on the single QUIC connection 110, where it is re-encrypted and placed within a QUIC message that is sent from the QUIC gateway 104 to the client 102 via the QUIC connection 110.

As such, the QUIC gateway 104 can enable communication sessions involving clients and servers that are both not willing to or not capable of communicating using QUIC.

The QUIC gateway 104 addresses and solves interworking problems that are unique to deployments involving QUIC. Namely, the QUIC gateway 104 can be configured to intelligently multiplex and demultiplex QUIC stream information in a manner that enables this information to be re-packaged and transported, for example, using a protocol that does not support the communication of multiple separate streams in a single connection (e.g., HTTP/1.x TCP).

Figure 9:
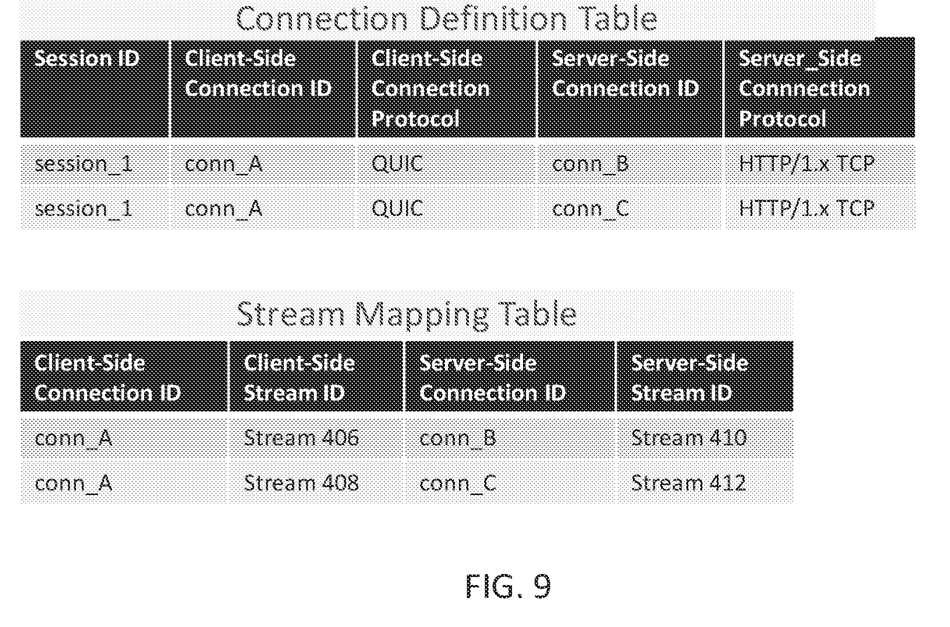
FIG. 9 shows an example connection definition table, stream mapping table, and tool definition and mapping table for the example scenario depicted in FIG. 6.

FIG. 9 shows an example connection definition table, stream mapping table, and tool definition and mapping table for the example scenario depicted in FIG. 6. In this example, the QUIC interworking inspection gateway generates and maintains client- and server-side connection definition and binding information, which is used to facilitate interworking and monitoring of QUIC communications. The mapping structure/data shown in FIG. 9 is simply one example of how connection/protocol interworking functionality could be implemented.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for processing QUIC communications in a network, the system comprising:

a QUIC gateway including at least one processor, a client stub, and a server stub for establishing proxied QUIC communications between a client and a server;

the server stub for receiving a QUIC connection request from the client;

the QUIC gateway for modifying the QUIC connection request and forwarding the modified QUIC connection request to the server via the client stub;

wherein the client stub implements a client side of a QUIC handshake with the server to establish a first QUIC connection between the client stub and the server;

wherein the server stub implements a server side of a QUIC handshake with the server to establish a second QUIC connection between the server stub and the client;

wherein the QUIC gateway is configured for:
receiving, via the first QUIC connection, encrypted QUIC data comprising a plurality of streams;
decrypting the encrypted QUIC data, resulting in decrypted QUIC data;
extracting each of the streams from the decrypted QUIC data, resulting in a plurality of extracted streams;
packaging at least one of the extracted streams into a non-QUIC protocol format, resulting in at least one packaged stream;
re-encrypting the decrypted QUIC data and transmitting the re-encrypted QUIC data to the server via the client stub; and a second network interface implemented on the QUIC gateway for transmitting the packaged stream to a network security tool, wherein the network security tool is configured to process the packaged stream in the non-QUIC protocol format and the network security tool comprises one or more of: a firewall, a deep packet inspection tool, an intrusion detection system (IDS), an intrusion prevention system (IPS), and a data leakage protection tool.

2. The system of claim 1, wherein packaging at least one of the extracted streams into a non-QUIC protocol format comprises encapsulating the at least one of the extracted streams for transport by hypertext transfer protocol (HTTP) or hypertext transfer protocol secure (HTTPS).

3. The system of claim 1, wherein the QUIC gateway is configured for packaging each of the extracted streams into a respective transport control protocol (TCP) connection.

4. The system of claim 1, wherein the QUIC gateway is configured for collectively packaging the extracted streams into a same transport control protocol (TCP) connection.

5. The system of claim 1 wherein the QUIC gateway is configured to perform certificate forging using information copied from a security certificate of the server allow the QUIC gateway to operate as a man-in-the-middle proxy between the client and the server.

6. A method for processing QUIC communications in a network, the method comprising:
providing a QUIC gateway including a client stub and a server stub for establishing proxied QUIC communications between a client and a server;
receiving, by the server stub, a QUIC connection request from the client;
modifying, by the QUIC gateway, the QUIC connection request and forwarding the modified QUIC connection request to the server via the client stub;
implementing, by the client stub, a client side of a QUIC handshake with the server to establish a first QUIC connection between the client stub and the server;
implementing, by the server stub, a server side of a QUIC handshake with the server to establish a second QUIC connection between the server stub and the client;
receiving, by the QUIC gateway and via the first QUIC connection, encrypted QUIC data comprising a plurality of streams;
decrypting, by the QUIC gateway, the encrypted QUIC data, resulting in decrypted QUIC data;
extracting, by the QUIC gateway, each of the streams from the decrypted QUIC data, resulting in a plurality of extracted streams;
packaging, by the QUIC gateway, at least one of the extracted streams into a non-QUIC protocol format, resulting in at least one packaged stream;
transmitting, by the QUIC gateway, the packaged stream to network security tool, wherein the network security tool is configured to process the packaged stream in the non-QUIC protocol format and the network security tool comprises one or more of: a firewall, a deep packet inspection tool, an intrusion detection system (IDS), an intrusion prevention system (IPS), and a data leakage protection tool; and
re-encrypting, by the QUIC gateway, the decrypted QUIC data and transmitting the re-encrypted QUIC data to the server via the client stub.

7. The method of claim 6, wherein packaging at least one of the extracted streams into a non-QUIC protocol format comprises encapsulating the at least one of the extracted streams for transport by hypertext transfer protocol (HTTP) or hypertext transfer protocol secure (HTTPS).

8. The method of claim 6, comprising packaging each of the extracted streams into a respective transport control protocol (TCP) connection.

9. The method of claim 6, comprising collectively packaging the extracted streams into a same transport control protocol (TCP) connection.

10. The method of claim 6 comprising performing, by the QUIC gateway, certificate forging using information copied from a security certificate of the server allow the QUIC gateway to operate as a man-in-the-middle proxy between the client and the server.

11. A non-transitory computer readable medium comprising computer executable instructions embodied in the non-transitory computer readable medium that when executed by at least one processor of at least one computer cause the at least one computer to perform steps comprising:
providing a QUIC gateway including a client stub and a server stub for establishing proxied QUIC communications between a client and a server;
receiving, by the server stub, a QUIC connection request from the client;
modifying, by the QUIC gateway, the QUIC connection request and forwarding the modified QUIC connection request to the server via the client stub;
implementing, by the client stub, a client side of a QUIC handshake with the server to establish a first QUIC connection between the client stub and the server;
implementing, by the server stub, a server side of a QUIC handshake with the server to establish a second QUIC connection between the server stub and the client;
receiving, by the QUIC gateway and via the first QUIC connection, encrypted QUIC data comprising a plurality of streams;
decrypting, by the QUIC gateway, the encrypted QUIC data, resulting in decrypted QUIC data;

extracting, by the QUIC gateway, each of the streams from the decrypted QUIC data, resulting in a plurality of extracted streams;

packaging, by the QUIC gateway, at least one of the extracted streams into a non-QUIC protocol format, resulting in at least one packaged stream;

transmitting the packaged stream to a network security tool, wherein the network security tool is configured to process the packaged stream in the non-QUIC protocol format and the network security tool comprises one or more of: a firewall, a deep packet inspection tool, an intrusion detection system (IDS), an intrusion prevention system (IPS), and a data leakage protection tool; and re-encrypting, by the QUIC gateway, the decrypted QUIC data and transmitting the re-encrypted QUIC data to the server via the client stub.

12. The non-transitory computer readable medium of claim 11, wherein packaging at least one of the extracted streams into a non-QUIC protocol format comprises encapsulating the at least one of the extracted streams for transport by hypertext transfer protocol (HTTP) or hypertext transfer protocol secure (HTTPS).

13. The non-transitory computer readable medium of claim 11 comprising performing, by the QUIC gateway, certificate forging using information copied from a security certificate of the server allow the QUIC gateway to operate as a man-in-the-middle proxy between the client and the server.

* * * * *